United States Patent

Ammar et al.

[11] Patent Number: 5,945,926
[45] Date of Patent: Aug. 31, 1999

[54] RADAR BASED TERRAIN AND OBSTACLE ALERTING FUNCTION

[75] Inventors: Danny F. Ammar, Broward; Randall C. Spires, Palm Beach; Steven R. Sweet, Broward, all of Fla.

[73] Assignee: AlliedSignal Inc., Morristown, N.J.

[21] Appl. No.: 08/856,362

[22] Filed: May 14, 1997

Related U.S. Application Data

[60] Provisional application No. 60/017,876, May 14, 1996.

[51] Int. Cl.⁶ ............................................. G08B 23/00
[52] U.S. Cl. .................... 340/970; 340/961; 340/963; 342/26; 342/65; 701/9; 701/14
[58] Field of Search ................................ 340/961, 968, 340/970, 963; 701/301, 120, 4, 8, 9, 14; 342/26, 29, 65

[56] References Cited

U.S. PATENT DOCUMENTS

| | | | |
|---|---|---|---|
| 3,052,882 | 9/1962 | Pidhayny et al. | 340/961 |
| 3,710,384 | 1/1973 | Ashcraft . | |
| 3,810,175 | 5/1974 | Bell . | |
| 3,815,132 | 6/1974 | Case, Jr. . | |
| 4,224,669 | 9/1980 | Brame | 701/8 |
| 4,435,707 | 3/1984 | Clark . | |
| 4,495,580 | 1/1985 | Keearns . | |
| 4,698,635 | 10/1987 | Hilton et al. | 342/64 |
| 4,891,762 | 1/1990 | Chotiros . | |
| 4,910,674 | 3/1990 | Lerche . | |
| 4,914,734 | 4/1990 | Love et al. | 342/64 |
| 4,965,573 | 10/1990 | Gallagher et al. | 340/968 |
| 5,111,400 | 5/1992 | Yoder | 342/29 |
| 5,202,690 | 4/1993 | Frederick | 342/26 |
| 5,293,325 | 3/1994 | Roos . | |
| 5,654,890 | 8/1997 | Nicosia . | |
| 5,661,486 | 8/1997 | Faivre et al. | 342/33 |

FOREIGN PATENT DOCUMENTS

| | | | |
|---|---|---|---|
| 0 565 399 A1 | 10/1993 | European Pat. Off. | G05D 1/06 |
| 0 678 841 A1 | 10/1995 | European Pat. Off. | G08G 5/02 |
| 40 41 204 A1 | 6/1992 | Germany | G01S 7/28 |
| 2 292 032 | 2/1996 | United Kingdom | G01S 3/32 |
| WO 95/33213 | 12/1995 | WIPO | G01S 13/00 |

OTHER PUBLICATIONS

McLean, Donald, "Automatic Flight Control Systems", 1990 Prentice Hall International, ISBN 0-13-054008-0, Chapters 10-11, pp. 317-418.

*Primary Examiner*—Brent A. Swarthout

[57] ABSTRACT

A radar based terrain and obstacle detection device for aircraft detects obstacles and terrain ahead of the aircraft. An alert is sounded if the obstacle or terrain is above a clearance plane positioned ahead of the aircraft.

12 Claims, 13 Drawing Sheets

608 ↘
PRI#  1 2 3 4 5 6 7 8 9 10 11 12 13 14 15 16 ...                    256
610 ↘  | | | | | | | | | | | | | | | | ...    | | | | | | | |
FREQ#  1 3 5 7 1 3 5 7 2 4 6 8 2 4 6 8 ...    2 4 6 8 2 4 6 8

ANTENNA  S S S S D D D D S S S S D D D D ...  S S S S D D D D
PORT

LO PHASE 0 π 0 π π 0 π 0 0 π 0 π π 0 π 0 ...  0 π 0 π π 0 π 0
CODE

612 ↗  S = SUM CHANNEL
       D = ELEVATION DIFFERENCE CHANNEL

*Fig. 6*

PRI#  1 2 3 4 5 6 7 8 9 10 11 12 13 14 15 16 17 ...
      | | | | | | | | | | | | | | | | | ...
616 → FREQ#  1 3 5 7 1 3 5 7 2 4 6 8 2 4 6 8 1 ...

CHANNEL  S S S S D D D D S S S S D D D D S ...

618 → LO PHASE  0 π 0 π π 0 π 0 0 π 0 π π 0 π 0 0 ...

614 → AMBIGUITY#  |1|2|3|4|5|6|7|8|9|10|11|12|13|14|15|16|17|

RANGE (nm)  0   23   46   69   92   115   138   161   184
                                                          ↑
*Fig. 7*                                                  ↖ 620

RADAR BASED TERRAIN AND OBSTACLE ALERTING FUNCTION

This application claims priority from U.S. provisional application Ser. No. 60/017,876 filed May 14, 1996 which is incorporated herein by reference. This application is also related to concurrently filed and commonly assigned patent applications "Autonomous Landing Guidance System" and "Improved Radar Resolution Using Monopulse Beam Sharpening" attorney docket numbers 542-95-001 and 542-95-002 respectively, the complete disclosures of which are hereby incorporated by reference.

BACKGROUND OF THE INVENTION

The present invention relates to monopulse radar and more particularly to the radar traditionally used for airborne weather detection.

Certain dedicated systems are currently manufactured to warn of potential flight hazards. Chief among these systems are those designed to prevent controlled flight into terrain accidents. Controlled flight into terrain accidents currently account for the greatest number of air fatalities, the risk of which is greatly increased by operations in low visibility conditions. Technology for avoiding controlled flight into terrain includes ground proximity warning systems, and terrain awareness and display systems.

Ground proximity warning systems use altitude information from radio altimeters and barometric altimeters, in conjunction with an individual aircraft's speed and climb characteristics, to warn flight crews that the terrain below the aircraft is rising dangerously fast. The ground proximity warning systems can also provide an aircraft flight crew with additional alerts by, for example, warning of aircraft deviation below glideslope or inappropriate aircraft attitude or configuration. Typical examples of ground proximity warning systems are disclosed in U.S. Pat. No. 3,946,358 entitled "Aircraft Ground Proximity Warning Instrument" and U.S. Pat. No. 4,914,436 entitled "Ground Proximity Approach Warning System Without Landing Flap Input," both incorporated herein by reference.

Terrain awareness and display systems combine ground proximity warning system technology with navigation data, a built-in terrain data base and existing cockpit display technology such as color weather radar, electronic flight instrument systems (EFIS) and map displays. Terrain awareness and display systems provide "look ahead" terrain warnings by utilizing present aircraft positions and a terrain data base to predict the aircraft's future position with respect to terrain. A typical example of a terrain awareness system is described in co-pending application Ser. No. 08/509,660, filed Jul. 31, 1995, entitled "Terrain Awareness System" by Muller et al, attorney docket number 543-94-001 and assigned to the same assignee as the present application; as well as in U.S. Pat. No. 4,646,244.

Although the ground proximity warning systems and terrain awareness and display systems described in the above-mentioned references have greatly reduced the controlled flight into terrain risk for aviation worldwide, both ground proximity warning systems and terrain awareness and display systems have some limitations. Neither of these systems actually "sees" the terrain or other obstructions ahead of the aircraft. Ground proximity warning systems differentiate the aircraft's altitude signals to detect abnormally high closure rates with terrain. Thus, discontinuities in the terrain profiles, such as a cliff, may not generate an alert in sufficient time to prevent an accident. The more sophisticated "look ahead" function of terrain awareness and display systems compares aircraft position data, based on either dead reckoning or a global positioning system, with a stored terrain map to calculate the aircraft's probable position relative to the terrain and determine whether a terrain collision threat exists. However, this system cannot detect collision threats due to obstructions not contained within the database. For example, temporary structures such as construction cranes would not be modeled in the database. In addition, the integrity of the alerting function depends directly upon the integrity of the aircraft position data. Errors in aircraft position could reduce the warning time given the flight crew. In addition, non-fixed terrain features and non-fixed terrain threats such as, for example, aircraft or vehicular traffic on the runway, are also not readily determinable by typical ground proximity warning systems.

Radar has the potential to provide the flight crew with real-time terrain information independent of both a calculated position and a computer-stored terrain data base. However, the only radar normally carried aboard non-military aircraft is weather radar. Weather radar has characteristics that make it non optimal for detecting terrain threats specifically. For example, the weather radar typically operates at a wavelength optimized to reflect small droplets of water. This wavelength presents additional problems when attempting to resolve large and/or closely spaced targets. Existing weather radar antennae also exhibit a limited elevation sweep angle.

The added weight and expense of a radar dedicated to terrain detection in addition to the already required weather radar prohibits use of terrain only radar systems. Yet, additional safety could be realized through the use of this additional radar information.

SUMMARY OF THE INVENTION

According to one aspect of the present invention, the invention uses the aircraft weather radar to detect terrain ahead of the aircraft. Use of the weather radar avoids the cost and weight penalties associated with using a separate dedicated terrain radar system. The terrain warning and obstacle alerting functions of the present invention can be implemented in such a manner as not to compromise the weather and windshear detection functions the weather radar is required to perform.

According to yet another aspect of the present invention, the terrain and obstacles detected by the present invention can be displayed to the flight crew using a cockpit display device. The cockpit display may be, for example, an overlay of the cockpit weather display, an EFIS display or a heads-up display.

According to still another aspect of the present invention, the invention may be incorporated and used in conjunction with other aircraft functions such as existing ground proximity warning devices or to facilitate emergency descents.

Similarly, the present invention supplements the Traffic Alert and Collision Avoidance System by providing warnings of potential runway or mid-air collisions, even when the intruding aircraft is not equipped with an Air Traffic Control Radar Beacon System transponder.

Other features and advantages of the present invention are described in greater detail below.

BRIEF DESCRIPTION OF THE DRAWINGS

FIG. 6 is a radar waveform according to an embodiment of the present invention;

FIG. 7 is an illustration of a radar waveform with frequency agility and phase coding of the local oscillator according to an embodiment of the present invention;

DETAILED DESCRIPTION OF PREFERRED EMBODIMENTS

In a preferred embodiment of the invention, a single channel X band weather radar, such as for example, a model RDR-4B manufactured by the Commercial Avionics Systems division of AlliedSignal, Inc. Olathe, Kans., is modified to interface with a monopulse phased array antenna. The single channel radar, as modified, transmits and receives monopulse waveforms to detect terrain.

The terrain and obstacle detection warning mode uses the coherent monopulse waveform to measure top of terrain height and provide azimuth sharpened ground map images ahead of the aircraft. Frequency agility and local oscillator bi-phase modulation is used to improve measurement accuracy, reduce interference from multiple time around echoes, and reduce interference from other radars.

After resolving obstacles and terrain present within the radar beam, the present invention further processes the radar image data to determine whether a warning or alert of a hazardous condition should be asserted. To detect a potentially hazardous condition, the relationships of the radar detected targets to clearance planes, centered along the aircraft's velocity vector, are evaluated according to defined criteria.

The paragraphs below describe in greater detail: the construction of the clearance planes and associated alert logic; the radar beam signal processing for extraction of terrain data; and the hardware implementation of a radar according to the teachings of the present invention.

3.0 Terrain Hazard Detecting and Alerting

The terrain and obstacle detection warning mode provides early warning of obstacles in the aircraft's flight path which project above a preselected clearance plane. According to one embodiment of the present invention, the terrain and obstacle detection warning mode has maximum height measurement error on the order of +/−300 feet at a range of 5 nautical miles; a probability of detection, or making an angle measurement, on the order of 99.99% and probability of false alarm, angle measurement noise, on the order of 1 in 1 million.

Figure 1:
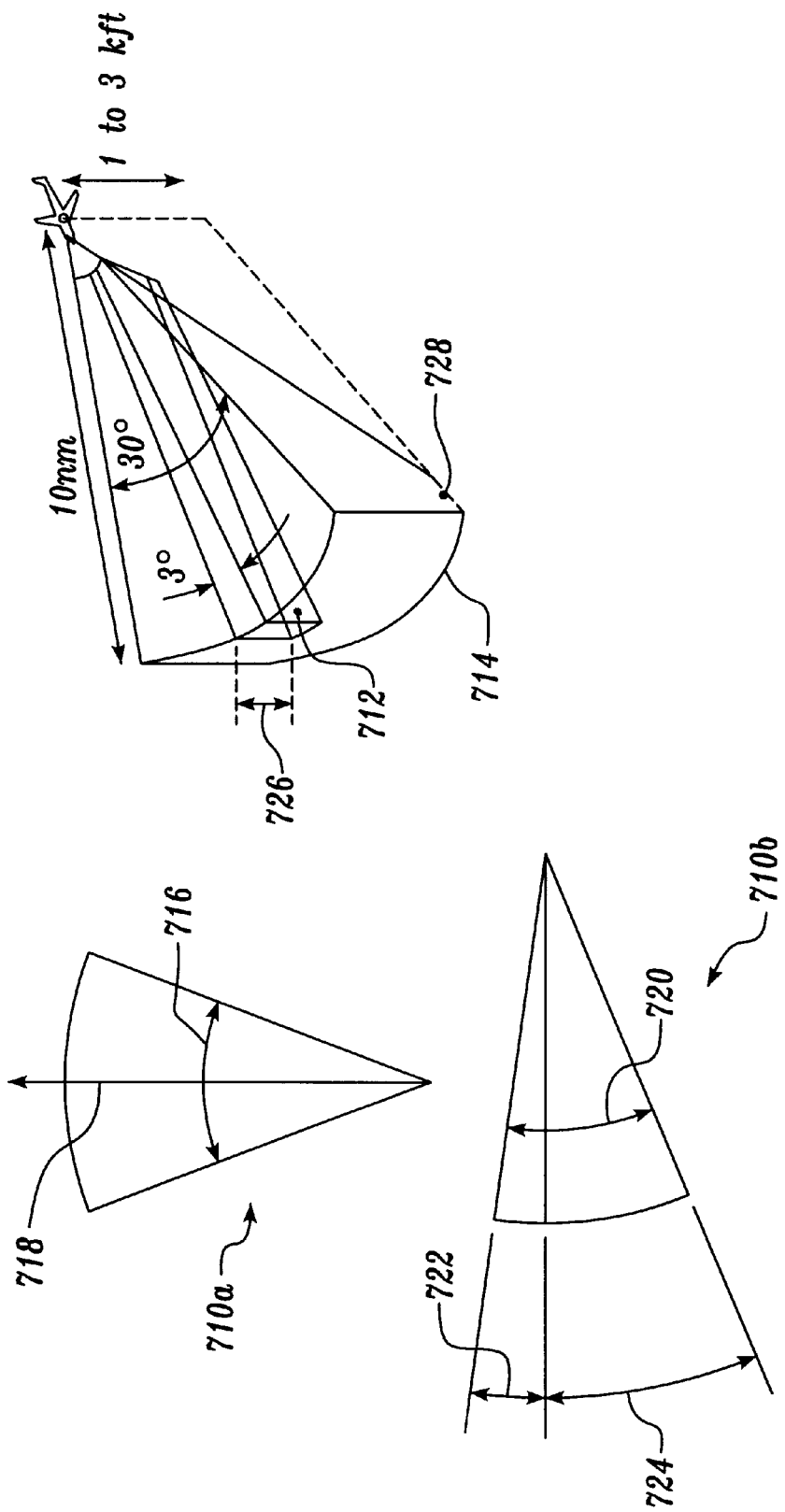
FIG. 1 is an illustration of radar elevation and azimuth scan patterns and construction of a clearance plane according to an embodiment of the present invention.

FIG. 1 illustrates antenna scan patterns 710a, 710b, the construction of clearance plane 712, and buffer zone 714 according to the invention. Antenna scan pattern 710a is a 30 degree azimuth scan 716 along the aircraft's velocity vector 718. Antenna scan pattern 710b illustrates a 30 degree elevation scan 720 scanning, for example, between +5 degrees above horizontal 722 and −25 degrees below horizontal 724 along the aircraft's velocity vector. The combination of the azimuth and elevation scans form a three dimensional wedge of radar data.

According to the invention, a clearance plane of pre-defined dimensions is virtually located within the wedge of radar data. In a preferred embodiment, clearance plane 712, also centered along the aircraft's velocity vector 718, is on the order of 3 degrees wide and is selectable in the range 726 from about 0 feet below the aircraft's flight path to about 1,000 feet below the aircraft's flight path and has a default value on the order of 500 feet below the aircraft's flight path. Clearance plane 712 extends to a minimum range of 10 nautical miles ahead of the aircraft.

A buffer zone 714 operates within an azimuth arc on the order of 30 degrees centered along aircraft velocity vector 718 and having a second variable clearance plane 728. Clearance plane 728 is at least 3,000 feet below the aircraft flight path when the aircraft is operating at an altitude above 10,000 feet and is on the order of 1,000 feet below the aircraft's flight path when the aircraft is operating at or below an altitude of 10,000 feet. These later dimensions for clearance plane 728 assume the terrain and obstacle detection warning function is de-asserted at altitudes below about 1,200 feet to prevent nuisance warnings. Buffer zone 714 extends to a minimum range of 10 nautical miles ahead of the aircraft.

Obstacles that are detected within the defined buffer zone are identified and displayed on a display in a plan position indicator format. Displayed obstacles may be merged on the display with weather data using different colors as is well known to those of skill in the art, for example, see U.S. Pat. No. 3,369,231.

When an obstacle is detected above the clearance plane, the invention issues a warning which may be an aural and/or visual alert. The range and height of the highest obstacle above the clearance plane within a radar range segment on the order of 1 mile is displayed in alphanumeric format. The invention may limit the maximum number of displayed targets above the clearance plane to prevent over crowding of the displayed data. For example, the invention may limit the maximum number of displayed targets above the clearance plane to 10.

Figure 2:
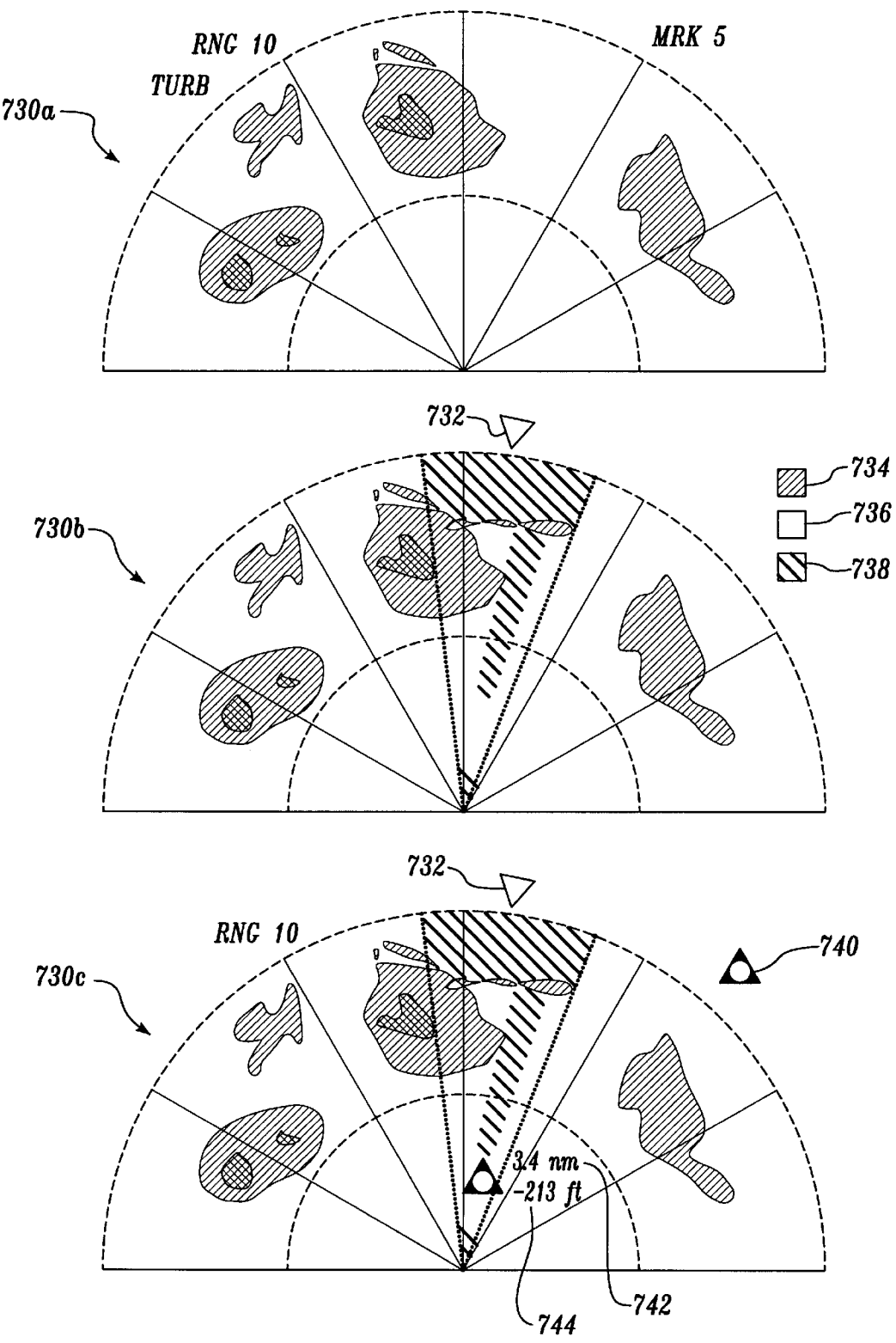
FIG. 2 is an illustration of a display format according to an embodiment of the present invention.

FIG. 2 illustrates the terrain and obstacle detection warning mode display format according to one embodiment of the present invention in greater detail. Those of skill in the art will recognize that other display formats may be used to display the terrain and obstacle detection warning mode information. When operating in a weather display mode, weather radar data is displayed in a standard weather display format 730a. When operating in a first weather and terrain display mode, display 730b displays horizontal or azimuth scan data and an aircraft velocity vector indicator 732. The azimuth scan data contains limited amounts of elevation data in wide view. Also displayed are indications of the terrain data relative to the buffer zone. As shown in FIG. 2, the display includes and an indication that detected terrain lies above a selected buffer zone using an "above buffer zone" indicator 734; an indication that detected terrain lies below a buffer zone using a "below buffer zone" indicator 736; and an indication that the terrain position relative to the buffer zone is unknown using an "unknown position" indicator 738.

When operating in a second weather and terrain display mode, a second weather and terrain display 730c includes vertical, or elevation, scan data in addition to the azimuth scan data. Display 730c provides an aircraft velocity vector indicator 732 and an indication that detected terrain lies above a selected buffer zone using an "above buffer zone" indicator 734; an indication that detected terrain lies below a buffer zone using a "below buffer zone" indicator 736; and an indication that the terrain position relative to the buffer zone is unknown using an "unknown position" indicator 738. Additionally, second weather and terrain display 730c provides an indication of the location of the detected terrain relative to the selected clearance plane. An "above clearance plane" indicator 740 indicates a potential hazard. In one embodiment of the invention, range from the aircraft 742 and distance below the aircraft 744 are displayed for terrain lying above clearance plane 728.

2.0 Interleaving of Weather and Terrain Detection Modes

The mode of operation for the radar of the present invention may be selected in various ways. For example, the pilot may select that the radar operate purely in the mode of collecting terrain data, or purely in the mode of collecting weather data. The mode may also be automatically controlled based on aircraft altitude, detection of a weather or terrain threat, or aircraft configuration. Preferably, however, the radar operates to interleave both weather and terrain data. This interleaved mode of operation permits the pilot to select a single mode for display if desired, yet retains the simultaneous weather avoidance and terrain hazard detection capabilities of the present invention.

Figure 3:
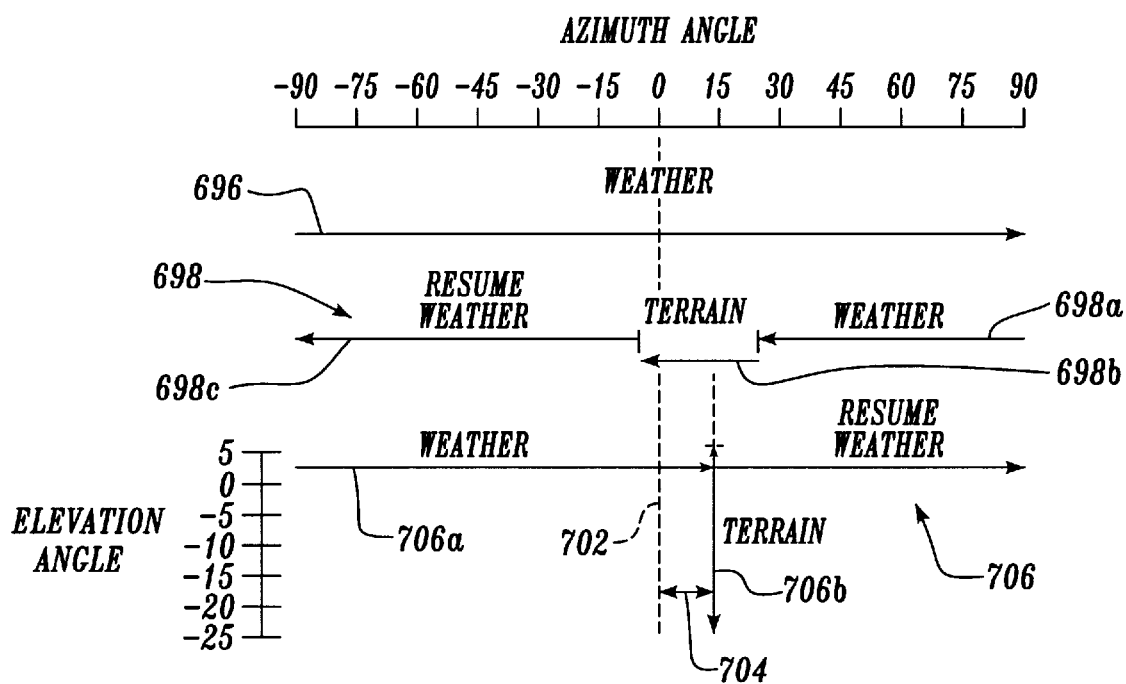
FIG. 3 is a diagram illustrating the interleaving of weather and terrain data according to an embodiment of the present invention.

FIG. 3 illustrates one method of interleaving weather and terrain data collection according to the present invention. In the embodiment of FIG. 3, a first radar scan 696 sweeps through an azimuth angle of −90 to +90 degrees and collects only weather data. During a second return scan 698, weather data collection 698a is interrupted at a point 15 degrees in advance of the aircraft's velocity vector. At this point, the radar begins collecting terrain monopulse elevation data in wide view and azimuth data for the next 30 degrees of sweep 698b at the rate of approximately 30 degrees per second. During the azimuth scan, the antenna elevation angle is computed based on aircraft attitude. Note that terrain detection sweep 698b is not centered about an azimuth angle of zero degrees, but is offset to account for the aircraft crab angle. During a third scan 706, weather data collection 706a is interrupted at a point coincident with the direction of the aircraft velocity vector and the radar transitions to a vertical, or narrow view scan 706b. Scan 706b collects a elevation data through an arc of approximately 30 degrees, from +5 degrees to −25 degrees, at the rate of 30 degrees per second. If one or more targets are detected above +5 degrees, the positive elevation of the scan may be increased above +5 degrees until there is no further target detection. After vertical scan 706b, the invention repositions the antenna at the pre-interruption position and reasserts a weather data collection mode 706c. The entire terrain data collection and processing time is on the order of 1 second per frame.

Figure 4A:
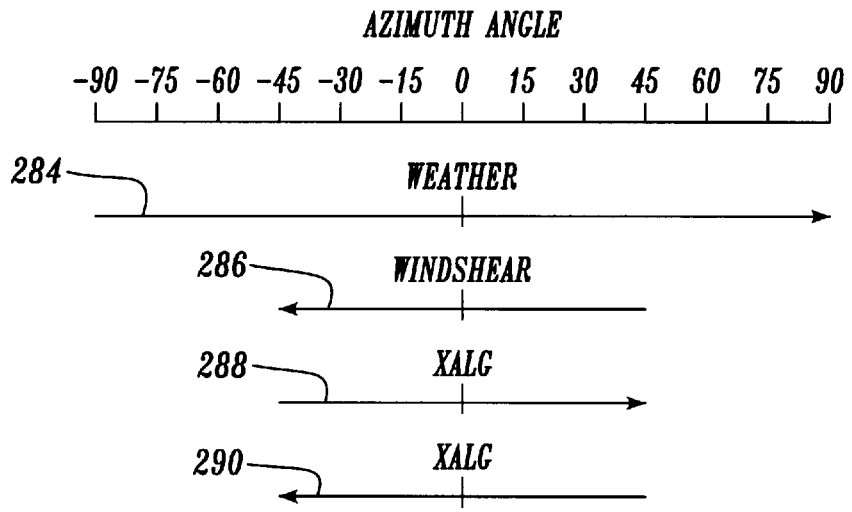
FIGS. 4A and 4B are diagrams illustrating the interleaving of weather and terrain data in the presence of windshear according to an embodiment of the present invention.
Figure 4B:
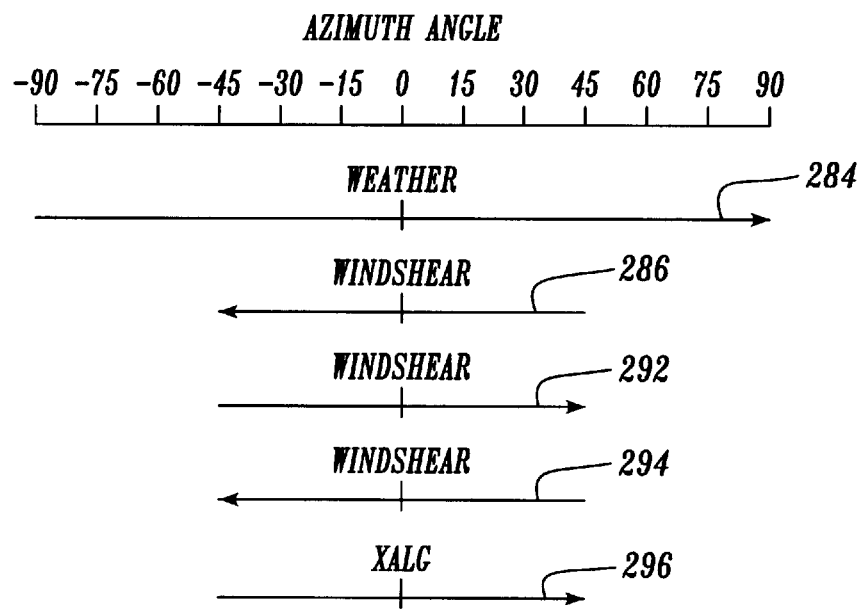

When the invention is implemented using weather radar, compliance must also be maintained with current Federal Aviation Administration regulations requiring a windshear detection capability. The windshear detection function is typically enabled below 1,200 feet altitude, in the vicinity of an airport during take off and landing. FIGS. 4a and 4b describe the interleaving of terrain and weather data, when the windshear detection mode is enabled. In FIG. 4a, during the first scan 284 of the radar system, weather data is collected and during the second scan 286 windshear data is collected. In a condition where no windshear is detected, the invention uses a third scan 288 and fourth scan 290 to collect terrain data.

FIG. 4b illustrates radar operation in the presence of windshear. In FIG. 4b weather data is collected during the first scan 284 of the radar system and windshear data is collected during the second scan 286. When windshear is detected during second scan 286, the invention collects windshear data during a third scan 292 and fourth scan 294 followed by a fifth scan 296 during which terrain data is collected.

3.0 Radar Characteristics, Waveforms and Signal Processing

Radar requirements and characteristics are prescribed by a combination of the desired warning times, the capabilities and requirements of the weather radar function (when dual purpose use is intended), and the desired accuracy of terrain resolution. For example, according to a preferred embodiment of the invention, the terrain look ahead ability is designed to provide sufficient warning for an aircraft to clear a 10,000 foot obstacle with a maximum aircraft acceleration of 0.25 g.

Figure 5:
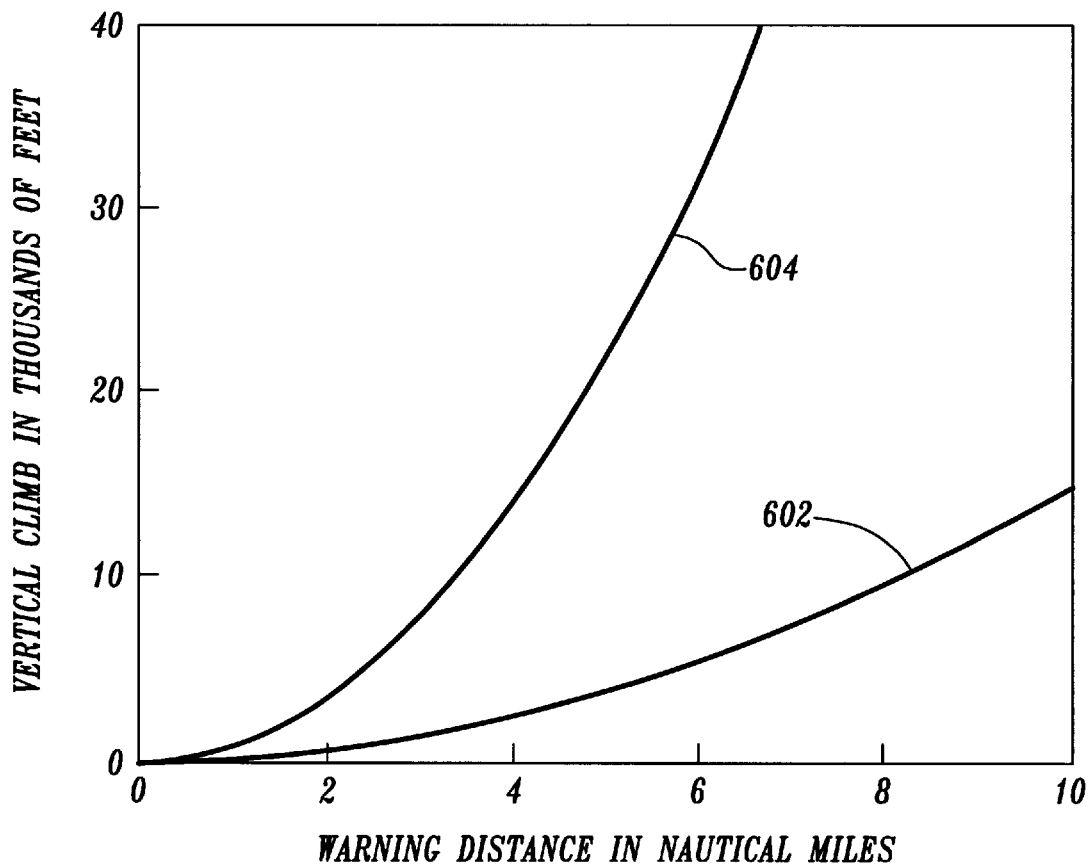
FIG. 5 is a graph of maximum climb vs. warning time.

FIG. 5 contains a graph of maximum vertical climb vs. warning distance of the type useful for deriving the radar performance specifications according to the present invention. As shown by curve 602, for altitudes above 10,000 feet and a speed of 600 knots, the radar must have a 8.5 nautical mile look-ahead capability to clear the 10,000 foot obstacle. As shown by curve 604, for altitudes below 10,000 feet at a speed of 250 knots, the radar must have a 3.5 nautical mile look-ahead capability.

Table 1 shows a comparison between preferred radar parameters or a radar optimized for terrain detection and a dual purpose eather and terrain detection radar. The range bin size for a preferred embodiment of the invention is 150 meters. For a radar optimized for the primary purpose of terrain detection, the preferred range bin size is 50 meters. However, the 150 meter range bin size of the preferred embodiment is consistent with the capability of existing weather radars. Although adequate for terrain angle measurement, the 150 meter range bin is too coarse for height measurement of narrow vertically extended targets, for example, radio towers. This limitation may be mitigated by upwardly biasing angle measurements, but system capability is desensitized by large biasing. Resolution of narrow targets can also be accomplished according to monopulse beam sharpening techniques generally known to those of skill in the art. Furthermore, higher bandwidth radars, such as those described in co-pending application serial number title "Monopulse Beam Sharpening for Improved Radar Resolution" attorney docket number 542-95-002 may be used to practice the ground proximity warning functions described herein when greater accuracy in resolution of targets is desired.

The optimum number of range bins for terrain detection is 384. The number of range bins for the single channel radar of the present invention is selected to cover a minimum of 10 nautical miles as determined from the requirements of FIG. 5. For the desired range, a total of 128 range bins proves sufficient.

Minimum clutter backscatter coefficient and clutter to noise ratio are also significant in determining the performance and suitability of a radar to the terrain detection function. The terrain and obstacle detection warning mode, according to the present invention, operates when the grazing angle is very shallow, on the order of less than 3 degrees. Thus, the minimum clutter backscatter coefficient is on the order of −45 dB square meter per square meter for snow covered terrain. Existing weather radars also provide sufficient clutter-to-noise ratio to fully implement the terrain and obstacle detection warning mode of the invention. For example, the RDR-4B radar can resolve terrain in 12 millimeter per hour intervening rain.

3.1 Radar Waveform

FIG. 6 shows one radar waveform suitable for practicing the present invention. Other waveforms may be used. The useful frequency band allocated to weather detection is 9.3 gigahertz. In the waveform of FIG. 6, one coherent processing interval, or dwell, comprises 256 pulses, collected at eight different frequencies. According to a preferred embodiment of the invention, these eight frequencies are centered around a 9.4 gigahertz center frequency at intervals of 6 MHz.

The number of frequencies and the spacing between them are selected based on having independent samples to insure that angle averaging results in true spatial averaging; maximizing non-coherent gain from frequency agility to produce smoother averaging; and having enough samples, or frequencies, to ensure accurate estimates of elevation extents, or target height above the surrounding terrain. As described below, elevation extent is directly proportional to the standard deviation of the monopulse angle estimates over frequencies. Thus, statistically, the higher the number of samples, or frequencies, the more accurate the estimate of the elevation extent, or target height above the surrounding terrain.

When the waveform of FIG. 6 is implemented using a single channel receiver, the sum and elevation difference antenna ports are collected on different pulse repetition intervals (PRI) 608. In a preferred embodiment of the present invention, the pulse repetition frequency is 7 kHz. This 7 kHz repetition frequency provides 11.5 nautical miles of unambiguous range which in turn allows a minimum warning distance of 8.5 nautical miles.

3.2 Interference Mitigation and Attenuation

Pulse to pulse multiplexing of the radar channels of FIG. 6 may cause interference from range ambiguous echoes. The worst case for this type of interference occurs at the radar maximum range. To mitigate this type of interference, an 8-bit code is used to phase modulate the local oscillator 612. FIG. 7 shows how frequency agility coupled with phase coding of the local oscillator can be used to prevent interference from the first sixteen range ambiguities 614 since they are either at a different frequency 616 or at a different phase 618.

Amplitude scintillation of backscattering from distributed targets is reduced by using frequency agility. Thus, if N observations of randomly distributed targets are made at N different frequencies separated by a minimum frequency spacing $\Delta F$, then the average of the N measurements is statistically equivalent to the average of N spatially independent observations of the distributed target. Stated differently, frequency agility is used to reduce glint and the fading variance just as spatial averaging would. Wehner, High Resolution Radar, shows that the greatest gain from frequency agility is obtained from the first 6 to 10 independent samples. Therefore, 8 frequencies are selected for practicing the present invention. However, as will be readily apparent to those skilled in the art, any number of frequencies in the range of 6 to 10 or more will be sufficient to practice the described embodiment of the present invention. The minimum frequency spacing $\Delta F$ is given according to:

$$\Delta F = c/2\Delta R, \qquad \text{Eq. (1)}$$

where:

c=speed of light; and $\Delta R$=range depth of the narrowest target of interest.

For example, if monopulse measurements are desired on very narrow, 20 feet or less, but extremely high, on the order of 1,000 feet or more, radio tower, then the minimum frequency spacing is 25 MHz. The total frequency agile bandwidth is then on the order of 200 MHz. This wide bandwidth effectively samples tower scatterers at a range resolution on the order of 2.5 feet. The top of narrow tower is detected using the described range resolution.

The following example calculation illustrates that interference from MTAE is also insignificant for implementations of the present invention in accordance with the specific parameters stated above. Assuming a 12 dB/octave fall off of clutter signal, including beam shape loss, as a function of range and an unambiguous range of 11.5 nautical miles, which corresponds to the 7 kHz pulse repetition frequency, the maximum return from multiple time around echo for the waveform is given by:

$$MTAE = -40*\log(N_A*R)/10, \qquad \text{Eq. (2)}$$

where:

MTAE=multiple time around echo;

$N_A$=number of range ambiguities due to frequency and phase diversity; and

R=unambiguous range.

For the above example, the maximum return from mean time around echo is given by:

$$MTAE = -40*\log(16*11.5)/10 = -50.6 \text{ dB}. \qquad \text{Eq. (3)}$$

The ambiguous targets 620, at 184 nautical miles are at the radar horizon when the aircraft is at an altitude of 25,000 feet. At lower aircraft altitude, mean time around echo is further reduced due to earth curvature. At aircraft altitude above 25,000 feet, ground targets at maximum range, 10 nautical miles according to the present invention, are at a much lower elevation angle than the ambiguous targets. Thus, mean time around echo is insignificant.

Figure 8:
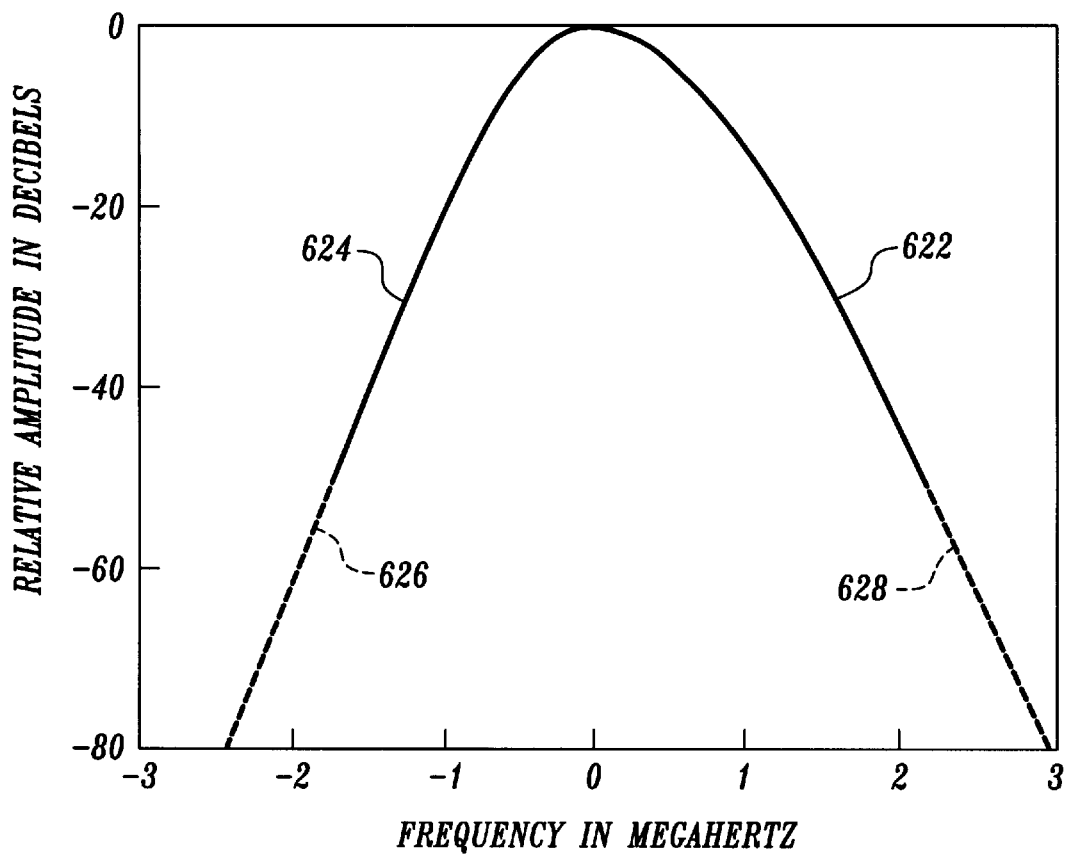
FIG. 8 is a graph of matched filter response according to an embodiment of the present invention.

Although pulse-to-pulse frequency multiplexing may also provide an additional source of interference from closely spaced frequencies, the terrain and obstacle detection warning mode is sufficiently isolated to reduce such interference to a minimum. The minimum frequency spacing used in the terrain and obstacle detection warning mode waveform is 6 MHz. FIG. 8 is illustrative of the matched filter frequency response 622. The solid curve 624 illustrates measured results while the dashed curves 626, 628 illustrate results extrapolated from the measured results. A minimum of 80 dB isolation is provided by a 6 MHz spacing between consecutive pulse-repetition-intervals.

3.3 Signal Processing

Figure 9:
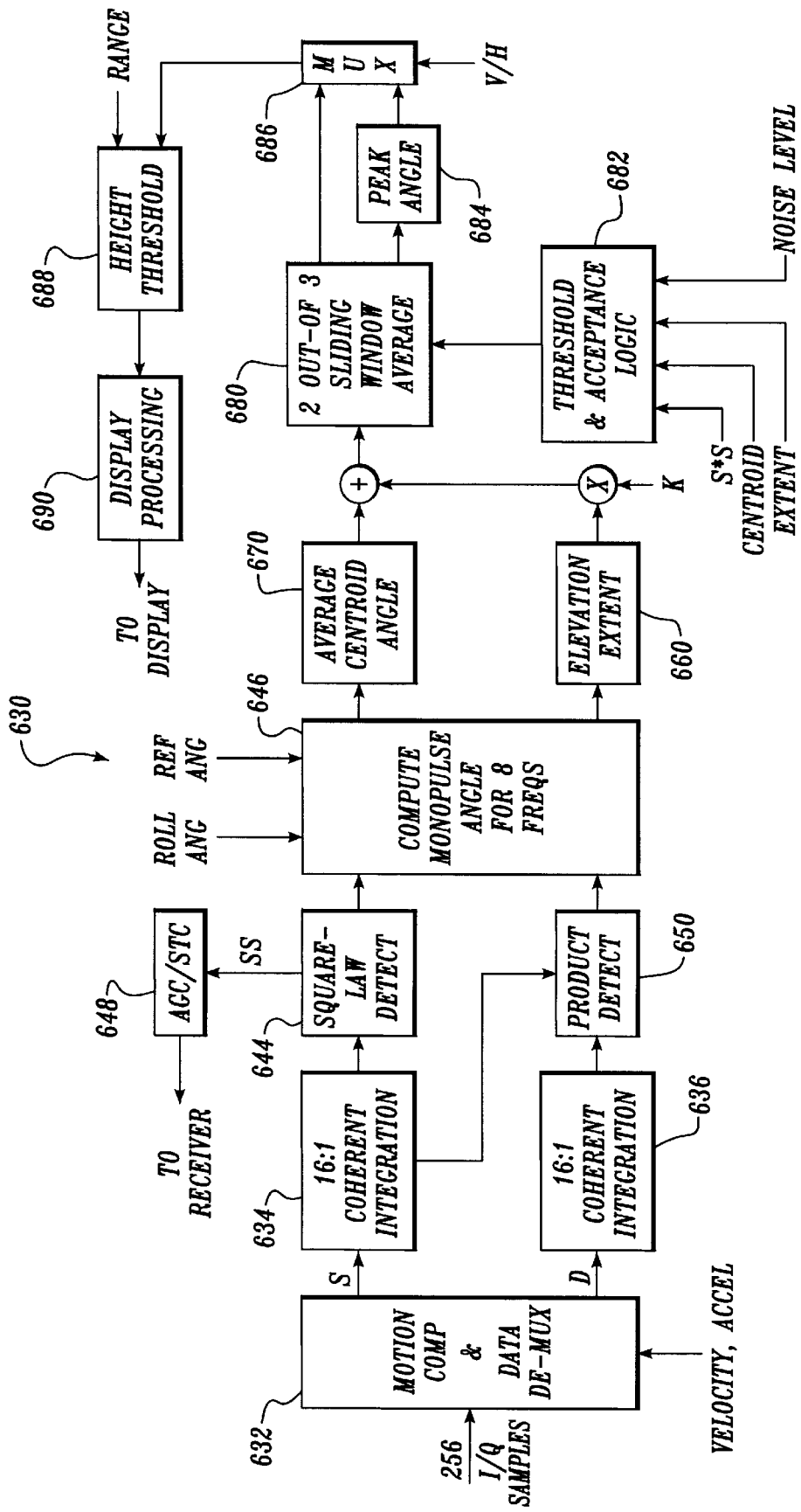
FIG. 9 is a block diagram of a signal processing algorithm according to an embodiment of the present invention.

FIG. 9 is a block diagram of the signal processing algorithm 630 for the terrain and obstacle detection warning mode radar according to one embodiment of the present invention. In a motion compensation and data de-multiplexing function 632, radar I and Q data is motion compensated and de-multiplexed into Sum and Delta channel data.

I/Q data processing may be explained for clarity as follows. Because the aircraft is moving relative to the terrain, motion compensation is used to account for Doppler shift and to demodulate the radar signals for local oscillator phase coding. The Doppler shift in pulsed radar is manifested in the phase of target echo signals from hit to hit. In order to recover the Doppler shift, the system measures and records the phase of each received echo. Samples of the target's position and amplitude may be gathered in by direct sampling or I/Q sampling. Although radar target echo signals may be sampled by direct sampling, the sense of the Doppler shift, the information as to whether the target was closing or moving away, is lost. Thus, most radar recover the Doppler shift using I/Q sampling to gather the target's position and amplitude information, where "I" stands for in-phase and is the cosine or real component of the signal and "Q" stands for quadrature and is the sine or imaginary component of the signal.

The phase shift caused by aircraft motion at each pulse repetition interval is given by:

$$\Phi_i = \frac{4\Pi}{c} F_i \Delta R_i \qquad \text{Eq. (4)}$$

where:

c=speed of light;

F=radio frequency in Hz;

i=pulse repetition interval number=1, 2, . . . 256; and

ΔR=change in range since the beginning of the dwell.

$$\Delta R = V_{los} * \Delta T \times i + 0.5 (A_{los} * \Delta T \times I)^2 \qquad \text{Eq. (5)}$$

ΔT=1/pulse repetition frequency;

$V_{los}$=line-of-sight velocity; and $A_{los}$=line-of-sight acceleration.

The input data is motion compensated and phase demodulated according to:

$$CX_i = X_i \times e^{j(\Phi_i + \Phi_c)} \qquad \text{Eq. (6)}$$

where:

$X_i$=complex radar data;

$\Phi_c$=local oscillator phase modulation code 0, Π, . . . ; and $CX_i$=corrected complex data.

The complex data is then de-multiplexed to form Sum and Delta channels according to:

$$S(n,f) \text{ and } D(n,f) \qquad \text{Eq. (7)}$$

where:

n=coherent pulse repetition interval number 1, 2, . . . , 16;

f=frequency number 1, 2, . . . , 8;

Σ=SUM channel data; and

Δ=Delta channel data.

Decorrelation of the radar Delta channel signal compared with the radar Sum channel signal due to the differential time delay resulting from the pulse multiplexing of the single channel radar is minimal. The Doppler frequency is given by:

$$f_d = -\frac{2v}{\lambda} \cos(\theta), \qquad \text{Eq. (8)}$$

where:

v=aircraft velocity in meters per second;

θ=angle from velocity vector to the target; and

λ=radio frequency wavelength in meters.

The Doppler spread across the beam ΔF is computed by differentiating the Doppler frequency $f_d$ with respect to the angle from velocity vector to the target θ according to:

$$\Delta F = \frac{2v}{\lambda} \sin(\theta) \Delta \theta, \qquad \text{Eq. (9)}$$

where:

Δθ=antenna 3 dB beamwidth in radians.

At a maximum scan angle of +/−15 degrees and 600 knots aircraft velocity, the radar spectral width is on the order of 267 Hz. The correlation function is the inverse Fourier transform of the power spectrum. Assuming that clutter scatterers are evenly spread over the entire beam in azimuth, a first order assessment of possible decorrelation of the radar Delta channel signal compared with the radar Sum channel signal due to the differential time display shows insignificant decorrelation. In the example, the power spectrum is a rectangle and the correlation function is given by:

$$f(\tau) = \frac{\sin(\omega \tau)}{\omega \tau}, \qquad \text{Eq. (10)}$$

where:

ω=πΔF; and

τ=differential time delay of 4 pulse repetition intervals= 571 microseconds.

The worst case correlation coefficient is 96% at 15 degrees. At zero azimuth the correlation coefficient is nearly 100%. Thus, decorrelation of the radar Delta channel signal compared with the radar Sum channel signal due to the time differential between the radar Sum and Delta channels is insignificant.

Motion compensator/data de-multiplexor 154 includes a Sum channel output and a Delta channel output. The Sum channel data is applied to a first 2:1 Sum channel coherent integrator 156 where the complex data for each frequency and each range gate obtained in processor of FIG. 9 are coherently integrated over 16 pulse repetition intervals in step 634 according to:

$$S(f) = \sum_{n=1}^{16} (S(n, f)). \qquad \text{Eq. (11)}$$

The Delta channel data is applied to a second 2:1 Delta channel coherent integrator 158 where the complex data for each frequency and each range gate obtained in processor of FIG. 9 are coherently integrated over 16 pulse repetition intervals in step 636 according to:

$$D(f) = \sum_{n=1}^{16} (D(n, f)). \qquad \text{Eq. (12)}$$

The coherent integration is used for gain over noise and cancellation of complementary code sidelobes.

Figure 10:
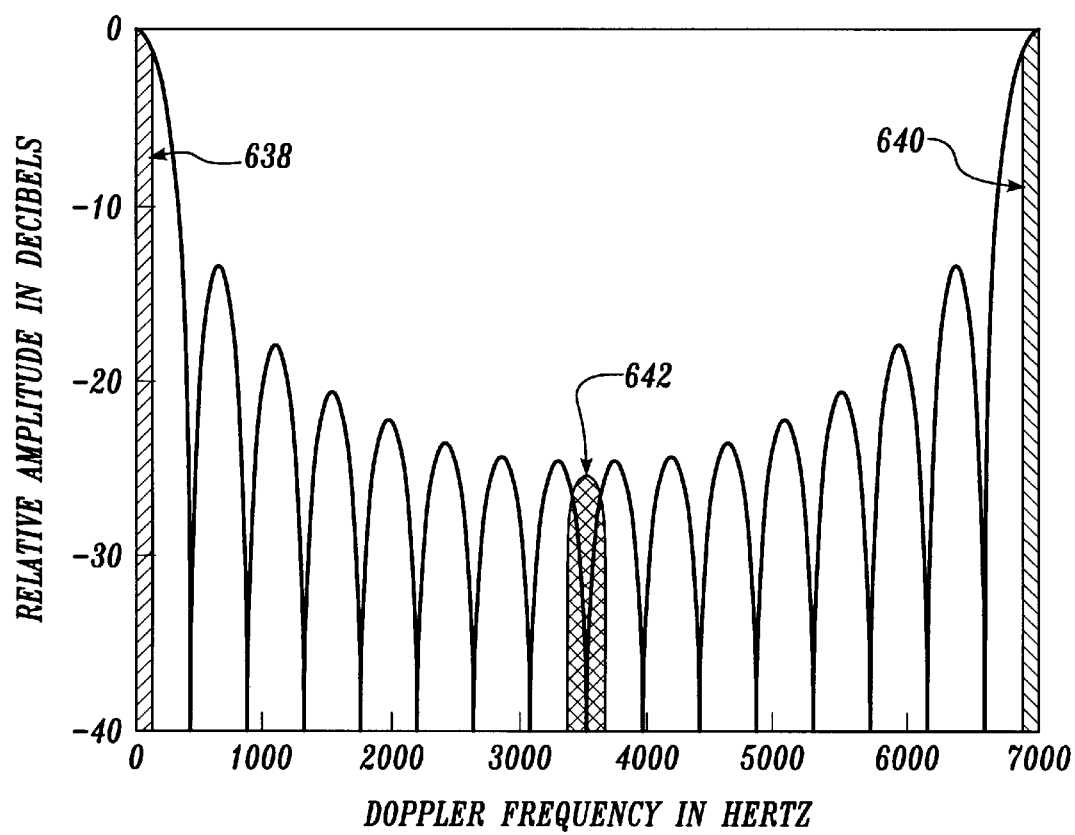
FIG. 10 is a graph of coherent integration filter response according to an embodiment of the present invention.

FIG. 10 illustrates a 16:1 coherent integration filter response. The coherent integration loss caused by clutter Doppler spreading 638, 640, which is ±133 Hz at 15 degrees, is estimated at 1 dB. Ambiguous returns 642 from the fourth ambiguity, discussed above, which are −26.5 dB down relative to unambiguous clutter, are further attenuated by coherent integration filters 634, 636 by an additional 30 dB for a total of 56.5 dB rejection.

The output of Sum channel coherent integration 634 of FIG. 9 is input to a square law detector 644. Coherent integration filter 634 output is square-law detected to compute the SS* which is used in the monopulse angle calculation 646 according to:

$$SS^* = (S_I + jS_Q)^*(S_I - jS_Q) = S_I^2 + S_Q^2. \qquad \text{Eq. (13)}$$

The output of the Delta channel coherent integration filter 650 is product detected with the Sum channel data to form Real[DS*] as given by Eq. (8) in process step 647, which is also used for angle measurement.

Figure 11:
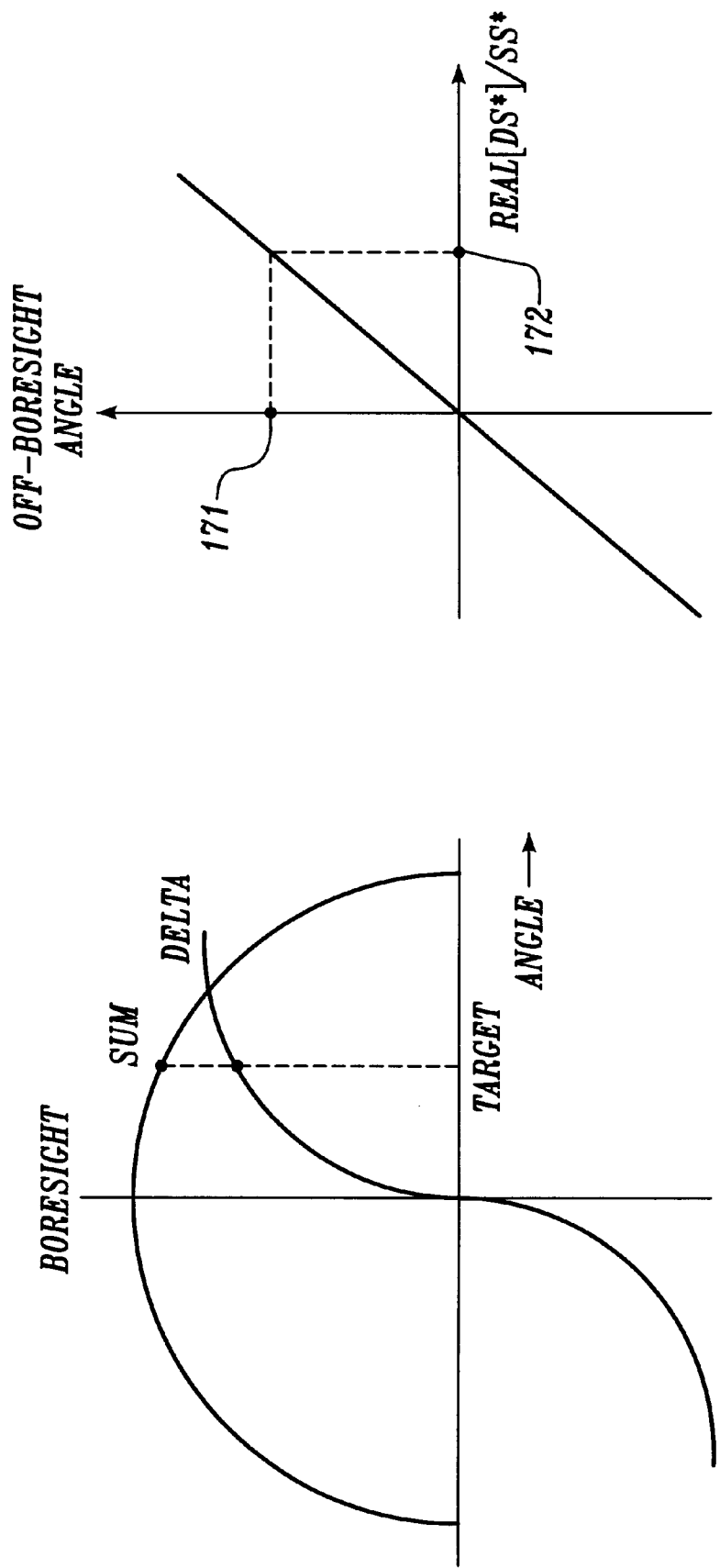
FIG. 11 is an illustration of target elevation extent described in polar coordinates according to an embodiment of the present invention.

Off-boresight angle, β, 171 of a target is directly proportional to ratio Real[DS*]/SS* 172 as illustrated in FIG. 11.

$$\beta = kslope \times \frac{\text{Real}[DS*]}{SS*} \qquad \text{Eq. (14)}$$

where:
kslope=antenna slope factor measured in the antenna lab; and
β=off-boresight angle.

The off-boresight angle is added to the horizontal referenced elevation angle, which is computed based on the antenna elevation angle and the tilt angle, in order to compute the target elevation angle below horizontal. In addition, the off-boresight angle is roll compensated according to:

$$\epsilon(f) = \phi_{Ref} + \mu \times \cos(\rho) \qquad \text{Eq. (15)}$$

where:
$\phi_{Ref}$=horizontal referenced antenna elevation pointing angle, provided at a minimum rate of 100 Hz;
ρ=roll angle; and
f=frequency number=1, 2, 3, . . . , 8.

Figure 14:
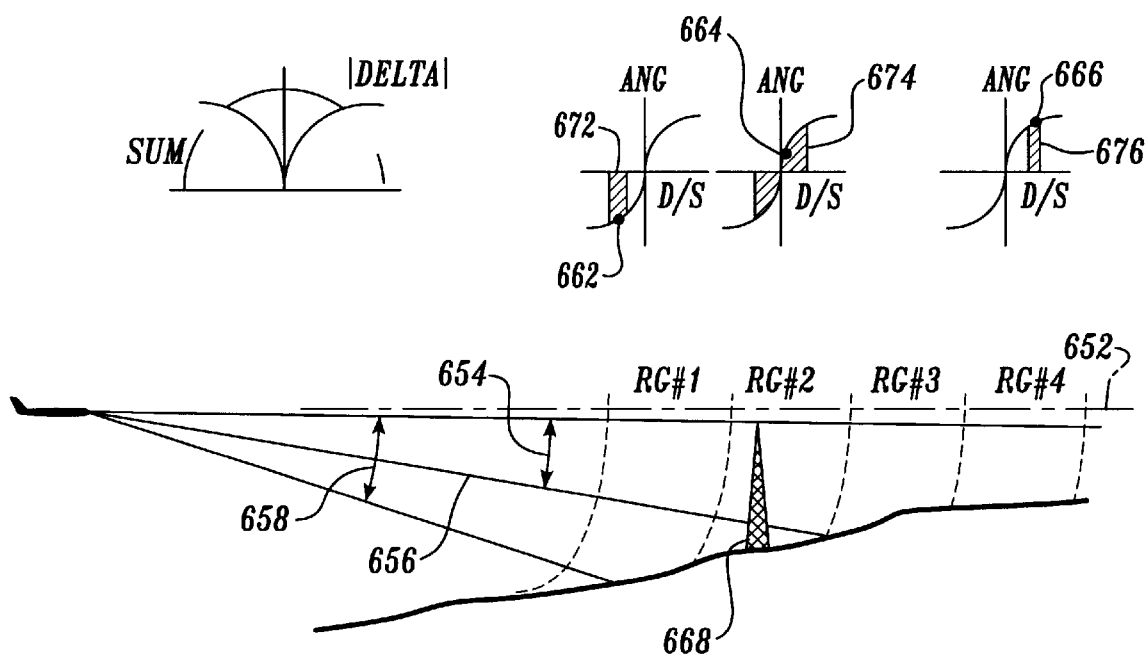
FIG. 14 illustrates target elevation extent, or height above surrounding terrain, in circular coordinates.

Target elevation extent, or height above surrounding terrain, is described in circular coordinates as illustrated in FIG. 14. Local horizontal 652, for airborne radars, is the plane containing the aircraft's roll and pitch axis. Airborne antennas may be roll and pitch stabilized and thus local horizontal 652 is the plane passing through the antenna's center of radiation and perpendicular to the earth's radius passing through the same point. Elevation angle 654 is the angle between the radar antenna boresight 656 and local horizontal 652. The radar antenna elevation scan sector 658 is shown for clarity.

In an elevation extent computation 660, the elevation extent, or target height above surrounding terrain, 662, 664, 666 of a vertically extended target, for example, a radio tower 668, is estimated from the standard deviation of the monopulse measurements over the different frequencies according to:

$$\sigma = Kext * \sqrt{\left(\frac{1}{nf}\right) \sum_{f=1}^{nf} \epsilon(f)^2 - \mu^2} \qquad \text{Eq. (16)}$$

where:
σ=target extent; and
Kext=extent factor nominal value=1.7.

The average elevation centroid angle is computed in an average centroid angle function 670. As illustrated in FIG. 14, the average elevation centroid angle is the mean of the monopulse angle estimates 672, 674, 676 from each of the frequencies and is given by:

$$\gamma = \left(\frac{1}{nf}\right) \times \sum_{f=1}^{nf} \epsilon(f), \qquad \text{Eq. (17)}$$

where:
γ=average centroid angle
nf=number of frequencies=8.

A top of terrain estimate is based on the top-of-target angle which is equal to the centroid angle plus the extent.

$$\beta_{top} = \gamma + \sigma, \qquad \text{Eq. (18)}$$

where:
γ=average centroid angle; and
σ=target extent, or target height above terrain.

The estimate of the target top is then used in the sliding window averager 680 which is also an M-of-N detector. When a target angle measurement is detected in at least 2 out of 3 consecutive dwells, the target angle measurement is found to be valid. Using the waveform described above and in FIG. 6, each dwell covers on the order of 1 degree of antenna scan. Therefore, a 3 degree antenna beamwidth scans past a target in three dwells. M-of-N sliding window 680 is used to improve probability of detection and reduce false alarm rate.

The thresholding and acceptance logic function 682 is used to validate each range gate of each dwell. A range gate is valid if its signal-to-noise ratio exceeds a threshold setting, its angle of arrival is within the antenna linear monopulse region, and its extent in elevation and range are consistent with a valid target. Heavy rain, for example, exhibits both a large elevation extent and a large range extent and, therefore, will be rejected by the thresholding logic, as an invalid target.

Figure 12A:
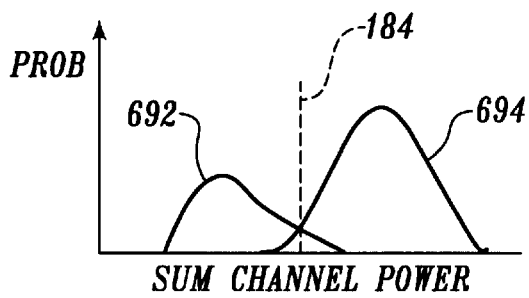
FIGS. 12a, 12b and 12c illustrate application of the thresholding logic to discriminate between valid and invalid targets according to an embodiment of the present invention.
Figure 12B:
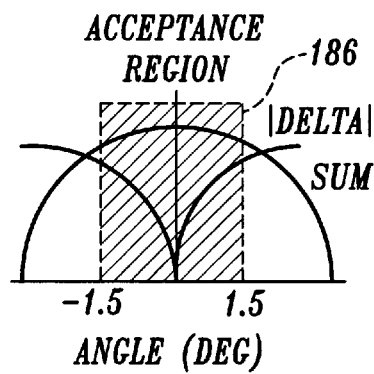
Figure 12C:
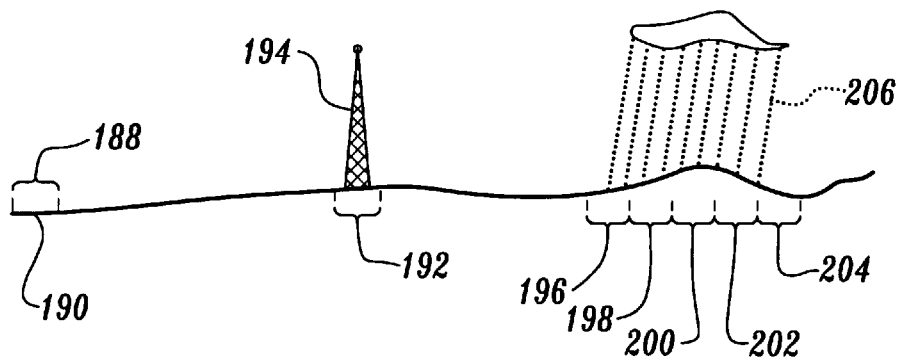

FIGS. 12a, 12b and 12c also illustrate terrain and obstacle detection warning mode thresholding concepts. FIG. 12a illustrates signal-to-noise threshold where threshold 184 is the cross-point of the noise curve 692 with the signal-plus-noise curve 694 plotted on the Sum Channel Power axis against the Probability axis. FIG. 12b illustrates the processing aperture threshold where the acceptance region 186 is the region between −1.5 degrees and +1.5 degrees. FIG. 12c illustrates extent thresholding where the terrain and obstacle detection warning mode accepts very low elevation extent targets such as terrain 190, accepts high elevation extent/low range extent targets such as tower 194, and rejects high range and high elevation extent targets such as heavy rain 206.

Data from sliding window averager 680 of FIG. 9 is input to peak detector 684. During vertical scans, data from sliding window averager 680 is peak detected to estimate the highest point in each target range gate, peak angle, $\beta_{peak}$, according to:

$$\beta_{peak} = \max[\beta_{top}(n)] \quad \text{Eq. (19)}$$

where:

$\beta_{peak}$=peak angle detected during vertical scan; and n=dwell number 1, 2, ..., n.

The peak angle is input to a multiplier 686 where the peak angle is converted into height by multiplying the angle by range. In a height threshold function 688, the peak height for each valid range gate is thresholded to identify whether the range bin is within the buffer zone in wide view or above the clearance plane in narrow view. The thresholded data is then input to the display processing function 690 for transmission to a display. During wide view scan, the data is coded into categories. For example, the data may be coded into three categories: below buffer zone, above buffer zone, and unknown. In narrow view, if obstacles are detected above the preselected clearance plane, the invention may issue a warning signal, for example, an aural or visual warning, and one or more signals representing data on obstacles detected within a predetermined range segment may be asserted. For example, the signals may represent any of a measured height and a measured range of the obstacle; the obstacles whose data are reported may be only the highest obstacle within the predetermined range segment; the predetermined range segment may be a reduced range segment on the order of 1 mile; and the signal may be converted to an aural or visual display. The display format has been described in detail above.

4.0 Hardware Implementation

Figure 13:
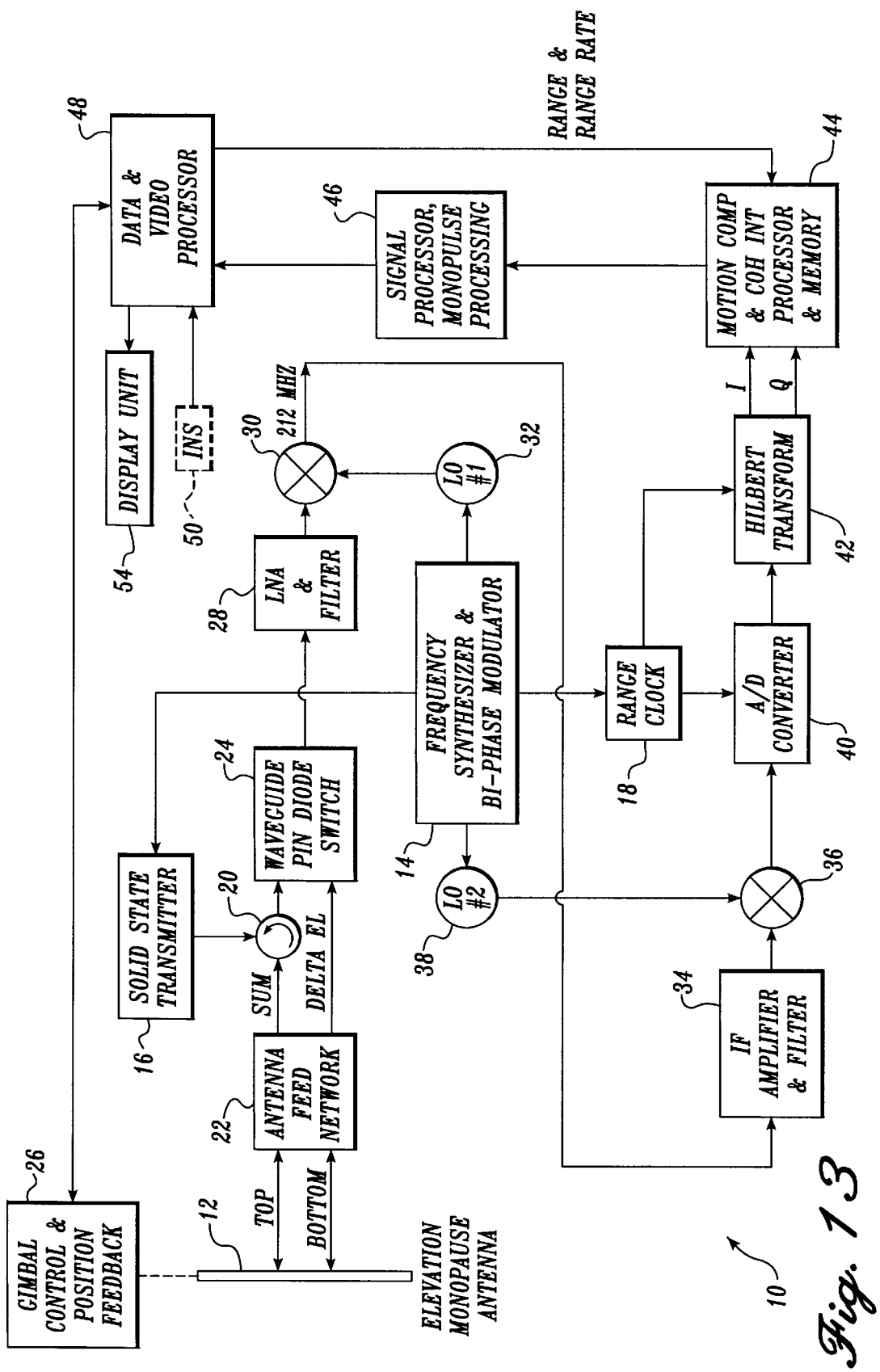
FIG. 13 is a block diagram of a single channel weather radar modified according to an embodiment of the present invention.

FIG. 13 contains a block diagram of a single channel weather radar 10 modified according to the present invention. The embodiment of FIG. 13 includes a standard 30 inch flat plate antenna 12 with a 3.2 degree beam width. Antenna 12 is of the type typically used in weather radar operating in the X-band and receiving pulse echoes for transmission through the single channel of the monopulse receiver. A single-channel monopulse radar constructed with less than the three traditional intermediate frequency (IF) channels combines the sum and difference signals such that they can be individually retrieved at the output.

A frequency synthesizer and bi-phase modulator 14 controls the transmitter pulse and combines the sum and difference signals such that they can be individually retrieved at the output. Frequency synthesizer and bi-phase modulator 14 may convert signals from radio frequency to different intermediate frequencies by separate local oscillators of different frequencies for each signal. The resultant signals are amplified in a single intermediate frequency amplifier of sufficient bandwidth for all three signals. At the intermediate frequency output, the signals are hard-limited and separated by three narrow band filters. The signals are then converted to the same frequency by beating two of the signals with the frequency difference between their local oscillator and the local oscillator of the third signal.

The invention may also be practiced with a two channel monopulse receiver which combines the Sum and Difference signals at radio frequency. In this alternative embodiment, frequency synthesizer and bi-phase modulator 14 excites the azimuth and elevation difference signals. A microwave resolver (not shown) is a mechanically rotated radio frequency coupling loop in circular waveguide. The energy into the coupler contains both difference signals coupled as the cosine and sine of angular position of the coupler. The combined difference or Delta signals (D) are added to the Sum signal (S). The outputs are S+D and S−D. The detected Delta information is separated into its two components: azimuth and elevation error information, by angle demodulation. The demodulator (not shown) uses a reference from the rotating coupler to extract the sine and cosine components from the Detla signal to give azimuth and elevation-error signals.

Frequency synthesizer and bi-phase modulator 14 further includes a timing generator. The timing generator generates the frequencies and synchronization signals used by the radar system which determines when the transmitter 16 fires. An exciter portion of solid state transmitter 16 activates transmitter 16 to initiate the emission of the radar pulses which are fed through to the radar antenna 12. Antenna 12 is thus energized via a signal from solid state transmitter 16 under the control of the timing generator via the exciter to radiate pulses in a suitable frequency band. At the same time that the timing generator pulses the exciter to initiate the emission of radar pulse, the timing generator also produces output pulses to determine how the other radar system functions relate to the time of transmission. One output of timing generator is a clock signal to a range clock 18.

The exciter portion of solid state transmitter 16 translates the waveform to the radar's illumination frequency and amplifies the waveform to a level usable by the final power amplifier portion of transmitter 16. The exciter supplies a transmitter drive signal to transmitter 16; a second output to a radio frequency receiver (not shown) and a calibration signal to the microwave integrated circuit (MIC) (not shown) located behind antenna 12. Transmitter 16 produces a short radar frequency pulse through circulator/duplexer 20 to antenna 12 at a pulse repetition frequency determined by a synchronous pulse generator (not shown). The pulsing of transmitter 16 causes a radar carrier signal pulse to be transmitted from radar antenna 12. In a preferred embodiment, transmitter 16 employs frequency agility or multiple frequency transmission, whereby the carrier frequency is changed from pulse to pulse as described above.

Elevation and azimuth monopulse antenna 12 includes a right and left side. Antenna feed network 22 illuminates the antenna lens causing the radiation to be focused in a narrow beam. On reception, target image is focused on focal plane of aperture and the energy in this image is collected by feed network 22. According to one embodiment of the present invention, antenna feed network 22 also divides the single channel data into Sum and Delta channels by time multiplexing these channels as described, for example, in FIG. xx. A waveguide pin diode switch 24 is used for commanding the Sum or Delta beam.

Circulator/duplexer 20 functions as an isolating device which alternately connects antenna 12 of the monopulse single-antenna system to transmitter 16 and the radio frequency receiver section and isolates antenna 12 from the non-connected function.

Circulator/duplexer 20 thereby protects the radio frequency receiver from transmitted power. Circulator/duplexer 20 includes three ports: transmitter 16, antenna 12, and the radio frequency receiver. Optionally, circulator/duplexer 20 may have a fourth port between transmitter 16 and the radio frequency receiver. The fourth port is terminated which increases the path loss. Circulator/duplexer 20 also functions in conjunction with a local oscillator (not shown) to translate the signal and interference to the intermediate frequency which is the difference between the signal frequency and that of the local oscillator. The resulting intermediate frequency is fed to the radio frequency receiver. The outputs of antenna 12 Delta azimuth channel and Delta elevation channel are also fed to the radio frequency receiver and through to an intermediate frequency receiver (not shown).

Gimbal control and position feedback circuit 26 provides a stable, closed loop servo system for positioning antenna 12 and controlling the antenna sweep. The antenna sweep pattern is under control of a data and video processor 48, to be described in greater detail below, which determines the sweep pattern and data collection mode according to the logic previously described. In the preferred embodiment of the invention, antenna 12 performs both azimuth and elevation scans. Gimbal control and feedback circuit 26 also rotates antenna 12 to perform the azimuth and elevation sector scans.

Also shown is FIG. 13 is a low noise amplification and filter section 28. Low noise amplification and filter section 28, which is also known in the art as radio frequency amplifier, passes the majority of the return signal while filtering unwanted noise. Amplification and filter section 28 determines the signal-to-noise ratio for the radar.

A mixer 30, coupled to local oscillator 32, translates the signal and interference to the intermediate frequency. The input to mixer 30 is the signal and interference information on the radio frequency carrier. Mixer 30 has 3 ports: R port for receiving signal at radio frequencies, L port for receiving a signal from local oscillator 32, and I port for outputting a signal at the Intermediate frequency. The output of mixer 30 is identical to the radio frequency input, including phase, except for a translation in frequency. The output of mixer 30 is an intermediate frequency signal which is transmitted to intermediate frequency amplifier and filter section 34.

Intermediate frequency and filter section 34 typically includes an intermediate frequency blanking section coupled to a down-conversion and gain control section coupled in turn to matched filters which are coupled to a coherent detector. The output of intermediate frequency and filter section 34 is transmitted to a mixer 36.

Mixer 36, coupled to the output of both intermediate frequency and filter section 34 and local oscillator 38, translates the signal and interference to the intermediate frequency. Inputs to mixer 36 are the output of intermediate frequency and filter section 34 and a sinusoid known as the local oscillator from local oscillator 38. Mixer 36 has 3 ports: R port for receiving signal at radio frequencies, L port for receiving local oscillator 38 output, and I port for outputting signal at Intermediate frequency to A/D converter section 40. The output of mixer 36 is identical to radio frequency input, including phase, except for a translation in frequency.

Local oscillator 38 is a sign wave generator which converts the echo to an intermediate frequency convenient for filtering and processing operations. In coherently processing a signal, local oscillator 38 acts as timing standard by which echo delay is measured to extract range information. Local oscillator 38 is an input to mixer 36 which provides the radio frequency power needed by mixer 36 for frequency conversion. Local oscillator 38 also maintains the relative phase at the intermediate frequency.

Mixer 36 output is received as input to analog-to-digital converter section 40 where the signal is digitized before being output to Hilbert Transform section 42 where an imaginary term is added to the real signal to simplify analysis. After analysis, the real signal is obtained by taking real part of the complex signal. The Hilbert Transform representation is one theoretical tool for deriving general properties of waveforms as is well known in the art. The output of section 42 is I/Q data useful for motion compensation of the radar signals as has been previously described. The method of I/Q recovery is well known to those of skill in the art.

The I/Q data is motion compensated in a motion compensation function of a motion compensation and coherent integration processor and memory section 44. Motion compensation predicts a moving target's motion or predicts a stationary target's apparent motion relative to a moving platform, for example, an aircraft. The process is well known to those of skill in the art and is typically implemented using a Discrete Fourier Transform (DFT). A coherent integration processor function of motion compensation section 44 time compensates for the data by giving an average or mean signal-to-noise (S/N) ratio for multiple return echoes of a transmitted radar signal. Usually, several echoes are processed together, or integrated, and the processed composite is applied to a selected threshold and the result stored.

The signal processor 46 switches modes between terrain detection and weather detection by switching the transmitted waveform. Signal processor 46 processes both the weather data and the terrain data. The weather data is processed according to algorithms well known to those of skill in the art. The terrain data is processed according to algorithms described elsewhere in this specification to evaluate the elevation or height of terrain features which extend above the selected clearance plane. Signal processor 46 includes matched filters specifically designed to maximize the output signal-to-noise ratio by enhancing target echoes and suppressing other signals.

Signal processor 46 treats the return signal and the interference at the echo frequency. Signal processor 46 filters unwanted signals to attenuate very strong signals which could saturate downstream circuits and amplifies the signal plus interference. Signal processor 46 treats target echo energy preferentially with respect to interfering signals. This preferential treatment involves dividing the signal space into segments, called bins, in one or more dimension, for example, range and Doppler. Target echo signal concentrates into a single bin while interference is spread equally among all bins. Most signal processors collect signals from several target hits, then sum or integrate the signals in various ways, typically using a digital computer. Signal processors typically work with I/Q demodulated receiver output after it is digitized by an analog-to-digital converter.

The output of signal processor 46 is input to a data and video processor 48. Data and video processor 48 provides signals to gimbal control and position feedback section 26 which rotates antenna 12 according to the invention. Navigation system 50 provides data to processor 48 to enable processor 48 to control antenna position sweep and data collection mode relative to the aircraft velocity vector. Navigation system 50 also provides information about aircraft attitude used to control the elevation sweep angle of the antenna as has been described. In the embodiment of FIG. 13, navigation system 50 is shown as an inertial navigation system. Those of skill in the art will recognize that any source of aircraft attitude and position data may be used, including but not limited to flight management system data (FMS), processed radio navigation data, and global positioning system data.

Data and video processor 48 may also be coupled to a display 54 and to the aircraft sensor fusion device (not shown). Processor 48 provides signals to display unit 54 to display terrain and/or weather data. Display 54 may comprise a heads up display, a standard weather radar display, an EFIS display or other multifunction display, either singularly or in combination.

Preferred embodiments of the invention have been described. Variations and modifications will be obvious to those of skill in the art. Headings used herein are for the convenience of the reader and do not have legal meaning The present invention may also be used to provide obstruction and obstacle clearance, as well as intrusion detection during taxi and takeoff. Furthermore, terrain alerting algorithms as disclosed in U.S. Pat. No. 4,646,244 and co-pending U.S. application Ser. No. 08/509,660 may be used to generate warnings of potential flight into the terrain detected by the present invention. The invention is also useful for marine applications as well as for teaching modification of marine weather radars. For at least these reasons, the invention is to be interpreted in light of the claims and is not limited to the particular embodiments described herein.

Table 2 defines antenna 12 parameters according to one embodiment of the invention. Table 3 defines gimbal control and position feedback 26 parameters according to one embodiment of the invention. Table 4 defines transmitter 16 parameters according to one embodiment of the invention. Table 5 defines parameters of the receiver according to one embodiment of the invention.

TABLE 1

| Parameter | Terrain Radar | Existing Whether Radar |
|---|---|---|
| Pulse repetition frequency | 7 kHz | 7 kHz |
| Number of range bins | 384 | 128 |
| Range bin size | 50 meters | 150 meters |
| Transmit pulse width | 330 nanoseconds | 1 microsecond |
| Radio frequency bandwidth | 200 MHz | 24 MHz |
| Number of frequencies | 4 × frequency sub-bands | 8 |
| Number of pulse repetition intervals per dwell | 256 | 256 |

TABLE 2

| Antenna Parameters | Value |
|---|---|
| Radio frequency ports | Sum, Delta_E1, Delta_Az(optional) |
| Gain | 35 dB |
| Radio frequency bandwidth | 250 MHz |
| Beam width | 3 degrees |
| Sidelobes: | |
| Peak | −30 dB |
| RMS. | −40 dB |
| Voltage standing wave ratio | 1.5:1 |
| Polarization | Vertical |
| Delta channel null depth | 20 dB, minimum |
| Delta lobe imbalance | less than 0.5 dB |
| Port-to-port isolation | 25 dB |
| Sum to Delta gain imbalance: | |
| over radio frequency bandwidth | 0.4 dB, maximum |
| Phase imbalance from 0°–180° | +/− 10 degrees, maximum |

TABLE 3

| Gimbal Control and Position Feedback Parameters | Value |
|---|---|
| Scan coverage: | |
| Azimuth | +/− 30 degrees |

TABLE 3-continued

| Gimbal Control and Position Feedback Parameters | Value |
|---|---|
| Elevation | +/− 30 degrees |
| Scan rate: | |
| Azimuth | 30 degrees per second |
| Elevation | 30 degrees per second |
| Acceleration | 600 degrees per second per second |
| Pointing accuracy: | |
| Azimuth | 0.1 degrees, minimum |
| Elevation | 0.1 degrees |
| Pointing stability | 0.1 degrees |

TABLE 4

| Transmitter Parameters | Existing Whether Radar Value | Optimum Value |
|---|---|---|
| Peak power | 100 watts | 100 watts |
| Pulse width | 1 microsecond | 333 nanosecond to 1 microsecond |
| Radio frequency bandwidth | 24 MHz | 250 MHz |
| Duty cycle | 0.7% | 0.23% to 0.7% |

TABLE 5

| Receiver Parameters | Existing Whether Radar Value | Optimum Value |
|---|---|---|
| Radio frequency bandwidth | 24 MHz | 250 MHz |
| Voltage standing wave ratio | 1.5:1 | 1.5:1 |
| Noise figure | 5 dB | 5 dB |
| Automatic gain control (bin-to-bin) | 85 dB | 85 dB |

What is claimed is:

1. A method of detecting terrain and obstacles using an aircraft radar comprising the steps of:

providing an airborne radar system configured for transmitting a waveform having parameters for detecting weather data during azimuthal and vertical scans and for processing weather data using a weather detecting algorithm;

interleaving an azimuthal terrain and obstacle detection scan into an azimuthal weather scan by:
  interrupting the azimuthal weather scan to switch to a transmitted waveform having parameters suitable for terrain mapping,
  collecting a first elevation radar data in a predetermined azimuth sector and centered on an aircraft velocity vector; and
  processing said first elevation radar data utilizing a terrain and obstacle detection algorithm;

interleaving a vertical terrain and obstacle detection scan into a vertical weather scan by:
  interrupting the vertical weather scan to switch to a transmitted waveform having parameters suitable for terrain mapping;
  collecting a second elevation radar data in a predetermined vertical sector and centered on an aircraft velocity vector; and
  processing said second elevation radar data utilizing a terrain and obstacle detection algorithm;

defining a clearance plane ahead of said aircraft; and providing an alert if an obstacle detected in said step of collecting a first and second radar data is located above said clearance plane.

2. The method of claim 1 wherein said step of providing an alert further comprises the step of providing an alert when said obstacle is within a predefined range segment.

3. The method of claim 1 wherein said steps of collecting a first and a second elevation radar data comprises the step of collecting X band radar data.

4. The method of claim 1 wherein said step of collecting a first elevation radar data further comprises the step of classifying a detected target position relative to a predefined buffer zone.

5. The method of claim 1 wherein said azimuth sector includes an offset related to an aircraft crab angle.

6. The method of claim 1 wherein said vertical sector includes an offset related to an aircraft crab angle.

7. The method of claim 1 further comprising the step of displaying a terrain data received during said steps of collecting a first and a second elevation data on a display.

8. The method of claim 1 further comprising the step of displaying said obstacle on a display.

9. A terrain and obstacle detection system for aircraft comprising:

an aircraft weather radar configured for transmitting a waveform having parameters for detecting weather data during azimuthal and vertical weather detection scans and for processing weather data using a weather detecting algorithm;

a radar antenna for collecting a first elevation data in a predetermined azimuth sector centered on an aircraft velocity vector and a second elevation data in a predetermined vertical sector centered on the aircraft velocity vector;

a signal processor for interleaving azimuthal and vertical terrain and obstacle detection scans into azimuthal and vertical weather detection scans by switching from a transmitted signal having parameters suitable for weather detection to a transmitted signal having parameters suitable for terrain and obstacle detection and for resolving said first and said second elevation data into a target data utilizing a terrain and obstacle detection algorithm; and an alerting device coupled to receive said target data for providing an alert when said target data includes an obstacle located above a clearance plane positioned ahead of the aircraft.

10. The system of claim 9 further comprising a display for displaying said target data.

11. A terrain and obstacle detection device for aircraft comprising:

an input for receiving data from an aircraft weather radar, configured for transmitting a waveform having parameters for detecting weather data during azimuthal and vertical weather detection scans and for processing weather data using a weather detecting algorithm, wherein said data includes a first elevation data in a predetermined azimuth sector and a second elevation data in a predetermined vertical sector;

a signal processor for interleaving azimuthal and vertical terrain and obstacle detection scans into azimuthal and vertical weather detection scans by switching from a transmitted signal having parameters suitable for weather detection to a transmitted signal having parameters suitable for terrain and obstacle detection and for resolving said data from said aircraft weather radar into a target data utilizing a terrain and obstacle detection algorithm; and an alerting device coupled to receive said target data for providing an alert when said target data includes an obstacle located above a clearance plane positioned ahead of the aircraft.

12. The device of claim 11 further comprising a display for displaying said target data.

* * * * *